(12) United States Patent
Morando (10) Patent No.: US 6,719,945 B2
(45) Date of Patent: Apr. 13, 2004

(54) GALVANIZING ROLL ASSEMBLY WITH SELF-ALIGNING HYDRODYNAMIC FILM LUBRICATED ROLLER-BEARINGS

(76) Inventor: Jorge A. Morando, 526 Riverview Trail, Cadiz, KY (US) 42211

( * ) Notice: Subject to any disclaimer, the term of this patent is extended or adjusted under 35 U.S.C. 154(b) by 47 days.

(21) Appl. No.: 10/045,785

(22) Filed: Jan. 10, 2002

(65) Prior Publication Data

US 2003/0111777 A1 Jun. 19, 2003

Related U.S. Application Data

(63) Continuation-in-part of application No. 10/020,101, filed on Dec. 14, 2001.

(51) Int. Cl.[7] ............................................. C22C 30/00
(52) U.S. Cl. ..................... 266/239; 420/586; 118/419
(58) Field of Search ................ 266/227, 239; 118/423, 419; 420/586, 585, 583

(56) References Cited

U.S. PATENT DOCUMENTS

| | | | |
|---|---|---|---|
| 5,538,559 A | * 7/1996 | Kleinmeyer et al. | 118/423 |
| 5,549,393 A | 8/1996 | Morando | 384/203 |
| 5,718,517 A | 2/1998 | Morando | 384/192 |
| 6,004,507 A | 12/1999 | Morando | 420/586 |
| 6,168,757 B1 | 1/2001 | Morando | 420/586.1 |
| 6,261,369 B1 | 7/2001 | Morando | 118/423 |

FOREIGN PATENT DOCUMENTS

| | | |
|---|---|---|
| DE | 19511943 | 10/1996 |
| EP | 0685569 A1 | * 12/1995 |

* cited by examiner

Primary Examiner—Scott Kastler
(74) Attorney, Agent, or Firm—Charles W. Chandler (57) ABSTRACT

This invention is related to galvanizing roll assemblies provided with self-aligning hydrodynamically lubricated roller-bearings used in equipment submerged in molten metal.

16 Claims, 6 Drawing Sheets

GALVANIZING ROLL ASSEMBLY WITH SELF-ALIGNING HYDRODYNAMIC FILM LUBRICATED ROLLER-BEARINGS

CROSS REFERENCE TO RELATED PATENT APPLICATION

This application is a continuation-in-part of United States Patent Application for SINK ROLL ASSEMBLY WITH FORCED HYDRODYNAMIC FILM LUBRICATED BEARINGS AND SELF-ALIGNING HOLDING ARMS, Ser. No. 10/020,101, and having a filing date of Dec. 14, 2001.

BACKGROUND AND SUMMARY OF THE INVENTION

Steel is galvanized by passing a continuous strip around a roll submerged in a bath of molten zinc or aluminum/zinc. The roll assembly includes a roll, a pair of holding arms and a pair of trunnions attached to the end of the roll to guide and provide tension to the metal strip being galvanized.

A cylindrical surface on the roll-bearing components rotates in a cylindrical surface or opening in the arm-bearing components. The coating lines operate at very low speed, and because of distortions of the arms and the roll due to stresses and high temperature exposure, a large clearance exists between the rotating and the stationary bearing components.

Consequently, only a single line, metal-to-metal contact exists between the two bearing surfaces, creating a very high surface unit loading that produces a metal-to-metal or boundary lubrication area, thus resulting in high wear, micro welding and other severe wear conditions. The large clearances further decrease the possibility of forming or creating hydrodynamic film lubrication and in addition, allow large contaminants to penetrate the sliding bearing areas, destroying the surface finish and ultimately resulting in the bearing's failure.

Summarizing: Galvanizing roll assemblies fail primarily due to premature bearing failures. The major reasons for bearing failures are:

a) Sliding friction: Creates extremely high coefficient of friction and micro-welding;

b) Single line contact: Creates extremely high surface unit loading, $$P = \frac{F}{A} = \frac{Load}{BearigArea}$$

Where F=roll weight+strip tension=8,000 to 12,000 pounds
A=bearing contact surface area≅0 at running start;

c) High material solubility and low hardness: Creates micro-welding, corrosive wear, abrasive wear;

d) Low operating speed: The hydrodynamic lubrication coefficient defined by:

$$L_c = \frac{\mu N}{P}$$

Where:
Lc=hydrodynamic lubrication coefficient
$\mu$=fluid viscocity
N=roll speed (revolutions per minute)
P=defined before in item (b)

Creates very low $L_c$ values which translates into very high friction coefficients by lack of formation of hydrodynamic film lubrication, accelerating bearing failure e) Large clearances, 0.350 in+: The strength of a hydrodynamic film as well as its formation and operating zone are inversely proportional to the bearing clearances. Large clearances eliminate any type of lubrication possibility.

I have solved some problems related to the environmental conditions that limit the life of apparatus submerged in molten metal. See, for example, my U.S. Pat. No. 5,549,393 issued Aug. 27, 1996, for "Self-Aligning Bearing for High Temperature Applications"; U.S. Pat. No. 5,718,517 issued Feb. 17, 1998, for "Self-Aligning Bearing for High Temperature Applications; U.S. Pat. No. 6,261,369 issued Jul. 17, 2001 for "Sink Roll for Galvanizing Bath"; U.S. Pat. No. 6,004,507 issued Dec. 21, 1999, for "Material Formulation for Galvanizing Equipment Submerged in Molten Zinc and Aluminum/Zinc Melts"; and U.S. Pat. No. 6,168,757 issued Jan. 2, 2001 for "Material Formulation for Galvanizing Equipment Submerged in Molten Aluminum and Aluminum/Zinc Melts".

However, a need still exists for a bearing having a longer life when submerged in molten metal. One approach is to use materials that resist solubility in galvanizing materials such as molten zinc or zinc aluminum alloys (Item "c" in above failure list). See for example my U.S. Pat. No. 6,168,757 issued Jan. 2, 2001, for Material Formulation for Galvanizing Equipment Submerged in Molten Aluminum and Aluminum/Zinc Melts which is incorporated herein by reference.

Another approach to reducing low speed sliding friction caused by a single line, metal-to-metal bearing contact is to use a single line ceramic-to-ceramic contact. Such an approach is disclosed in Patent Application DE19511943A1 laid open by the German Patent Office Oct. 10, 1996. This patent was issued to Heinrich Pennenbecker. Pennenbecker discloses a trunnion mounted in a bearing housing supported by roll-holding arms. The trunnion has a series of circumferentially spaced, axially extending recesses. An elongated ceramic bearing box is mounted in each recess. Each bearing box extends beyond the trunnion surface, slidably engaging the cylindrical opening of the bearing housing.

Pennenbecker's bearing does not address all the bearing failure reasons of the conventional galvanizing bearings which employ a shaft with a single line contact but, in addition, he has introduced some problems of his own. The difference in the coefficients of expansion between the steel housing and the ceramic bearing shell creates a large clearance at galvanizing operating temperature (900° F.). It can be demonstrated that shrink-fitting of the shell is not possible nor sufficient to solve the problem.

Further, the inserts have to be made square to prevent rotation and breakage, eliminating multiple point contact and making hydrodynamic lubrication impossible. Ceramic material is brittle, which makes it very sensitive to bending, impact stresses, and contamination, especially with large bearing clearances. Ceramic-metal bearings as well as ceramic-ceramic bearings tend to fail suddenly (catastrophic failure) due to their intrinsic brittleness, while super alloy bearings wear out slowly giving the operator either time or warning of their need for replacement. Ceramic inserts tend to break with minor misalignments or impacts because of the roll's weight, which may be more than two tons, added to a strip tension of 6,000 to 10,000 pounds. Overloading unlubricated ceramic material causes dynamic instability.

Although Pennenbecker has been part of the prior art for several years, I am not aware of anyone using these bearings. My new design addresses all points in the bearing failure list ("a" thru "e").

My new design contemplates at least three roller-bearing embodiments. In one embodiment, the rollers are contained within a cage between the trunnion and the bearing shell. Rollers made with materials disclosed in my prior patents are suitable for most loads (Item "c" in failure list).

The preferred embodiment employs a plurality of rollers, eliminating 95% of the sliding friction by introducing "rolling motion" (Item "a" in failure list) and multiple line contact (Item "b") in lieu of single line contact. The number of rollers is increased with increasing loads, to assure a larger number of line contacts. Mounted in a cradle sleeve, the rollers are between a trunnion having a cylindrical outer surface and a self-aligning shell (bearing housing) having a cylindrical inner surface (outer race) around the rollers. In one embodiment, the trunnion is attached to the end of the roll and rotates on the rollers located within a rocking bearing shell contained in the holding arm. In the other embodiment, the rollers are mounted between a trunnion fixed to the holding arm, and a self-aligning roller carrying bearing shell driven by the roll.

In both embodiments, each roller is partially but rotatably contained within a cylindrical recess in a cradle. In either case, each roller is mounted in its recess with the necessary clearance to form a hydrodynamic lubricating film (Item e in failure list) between the concave surface of the recess and the surface of the roller. The roller speed $N_R$ (RPM) is several times the rolls' trunnion speed because the roller diameter is much smaller than the trunnion diameter:

$$N_R = \frac{N_T D_T}{D_R}$$

$N_R$=Roller RPM
$D_T$=Trunnion diameter
$D_R$=Roller diameter
$N_T$=Trunnion RPM=roll RPM
Providing $N_R>5N_T$ (Item "d" in failure list)

This advantage when combined with the reduction of surface unit loading by multiple line contact, gives my design a lubrication coefficient $L_c$ 15 to 25 times higher than a standard state-of-the-art bearing.

In addition, this arrangement provides a special advantage because a conventional roller-bearing typically has two points of contact, one with a non-rotating element and the other with a rotating element. In each case, the element having the larger bearing diameter will cause the roller to slide part of its travel motion, because the radius of the outer race is greater than the radius of the inner race.

The hydrodynamic film formed, which is described in some detail in my prior co-pending application, eliminates sliding friction between the roller and the cage in which the roller is mounted, while providing a high loading capacity and multiple contact areas. The bearing is preferably self-aligning by using a rocking sleeve-bearing race combination. The rocking sleeve permits a swiveling relationship to compensate for any misalignment between the axis of rotation of the trunnion within either the arm or the roll. The bearing races minimize the friction areas while providing for contamination "cleaning" (wiping) by utilizing high hardness/low friction coefficient super alloy materials.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
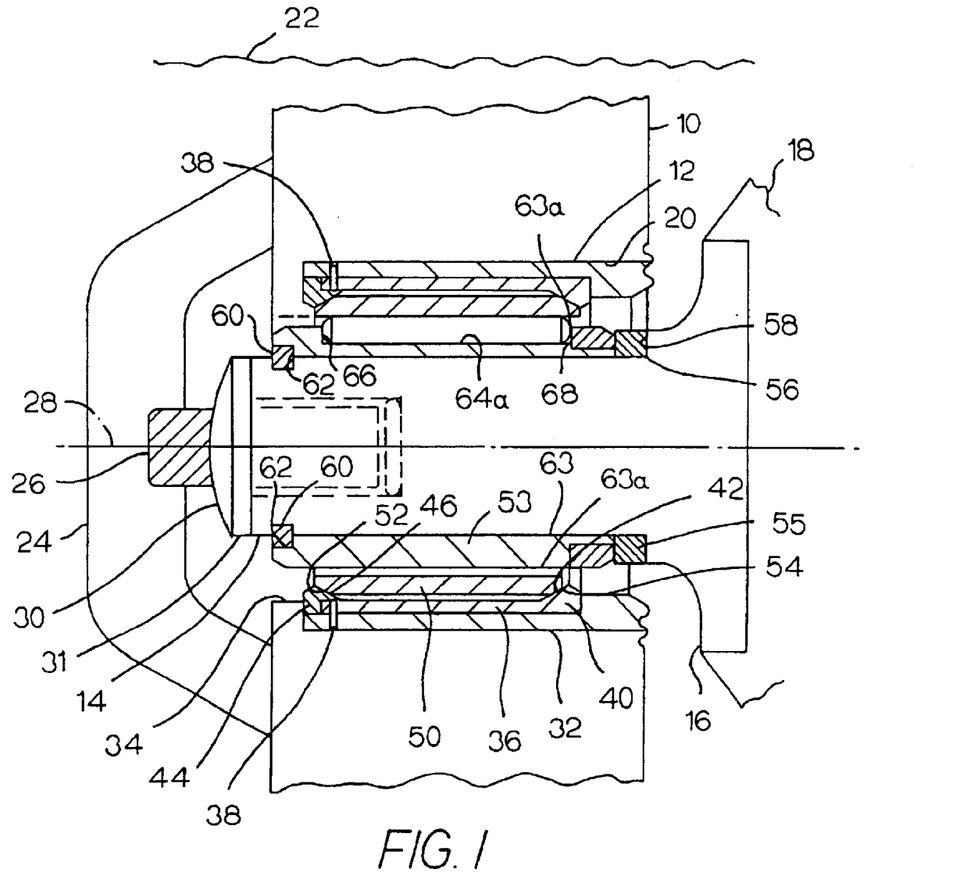
FIG. 1 is a fragmentary sectional view of a holding arm roll assembly end, showing the roller-bearing mounted on the trunnion of a roll submerged in molten metal, and illustrating the preferred embodiment of the invention.

Referring to the drawings, FIG. 1 is a fragmentary view of a holding arm assembly 10. A roller-bearing means, generally indicated at 12, supports a roll's trunnion 14. The trunnion has a flange 16 attached to a strip-supporting roll 18. Roll 18 is used for transferring a steel strip (not shown) of the type illustrated in my U.S. Pat. No. 6,261,369 issued Jul. 17, 2001, and U.S. Pat. No. 5,549,393 issued Aug. 27, 1996. The other end of the roll, not shown, would have a trunnion supported by a similar roller-bearing-arm assembly, carried by an arm that is a companion to holding arm 10.

Trunnion 14 is elongated and supported in a horizontal position within a holding arm-bearing assembly opening 20. Bearing means 12 is self-aligning to accommodate variances between the axis of rotation of the roll, and the central axis of opening 20, which may be caused by distortion of either the holding arm, or the trunnion, or the load applied to the roll. A similar bearing means, but without the roller-bearings, is illustrated in my co-pending patent application.

The roll and the lower end of the holding arm are submerged in a bath of molten galvanizing metal, for example, a zinc mixture having a surface level 22.

An elongated, generally U-shaped stop holder 24 has its ends attached to the holding arm on opposite sides of opening 20. Stop holder 24 supports arm stop 26 along central axis 28 of the bearing opening. The inner end of the arm stop engages a partially spherical surface 30 of a trunnion end stop 31 threadably mounted on the end of the roll's trunnion. Surface 30 of the roll's trunnion end stop accommodates any swiveling motion occurring between the trunnion and the holding arm.

A self-aligning bearing housing 32 is mounted in bearing opening 20. The inner end of housing 32 abuts an annular shoulder 34 disposed around the outer end of the bearing opening. An outer race sleeve 36 is received within the inner cylindrical bore of housing 32. A pair of ring pins 38 attach the outer race sleeve to the housing to prevent any relative rotation between the outer race sleeve and the housing.

Housing 32 has an internal annular shoulder 40 with a concave annular spherical bearing surface 42.

Figure 2:
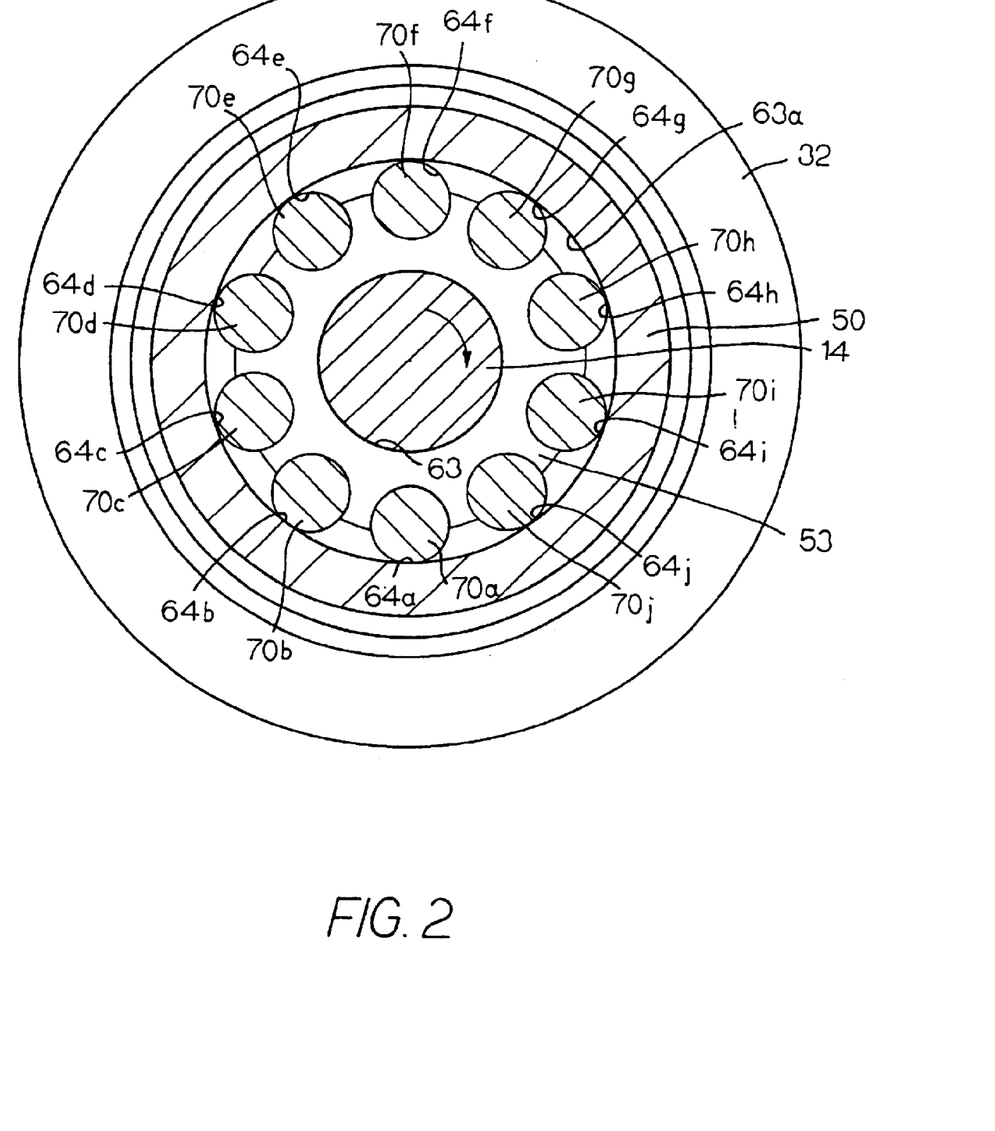
FIG. 2 is a view as seen along lines 2—2 of FIG. 1.

Still referring to FIGS. 1 and 2, bearing race ring 44 is mounted adjacent the outer end of housing 32 abutting shoulder 34. Ring 44 also has a concave annular spherical bearing surface 46 facing bearing surface 42.

A rocking sleeve 50 is mounted inside bearing housing 32. The rocking sleeve has a convex, annular spherical bearing surface 52 slidably engaging bearing surface 46. A similar convex annular spherical bearing surface 54 on the rocking sleeve slidably engages bearing surface 42 to accommodate any swiveling motion between the trunnion and the holding arm.

Figure 1A:
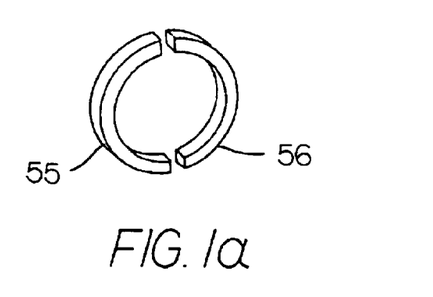
FIG. 1a is a perspective view of the stop rings.

A cradle sleeve 53 is mounted on and rotates with the trunnion. Referring to FIGS. 1 and 1a, one end of the cradle sleeve abuts a pair of stop rings 55 and 56 that are mounted adjacent an annular shoulder 58 on the trunnion. The other end of the cradle sleeve abuts sleeve pins 60, only two shown, each mounted on the trunnion in a hole 62.

The cradle sleeve has a cylindrical inner surface 63 engaging the trunnion. The outer surface of the cradle sleeve has a cylindrical diameter less than the cylindrical inner surface of the rocking sleeve to form a lubricating passage 63a around the cradle sleeve. The cradle sleeve has ten, for descriptive purposes only, elongated parallel, axial extending cylindrical roller-bearing recesses 64a to 64k, as shown in FIG. 2. Referring to FIG. 1, each roller-bearing recess has a pair of opposed bearing surfaces 66 and 68 to retain the rollers axially. Each roller-bearing recess has a cylindrical, concave cross-section and opens into passage 63a. The bearing recesses are equally angularly spaced around the surface of the cradle. Each recess has a cross-section greater than 210° (see FIG. 2).

Ten elongated rollers 70a to 70h are mounted in the cradle, each roller rotatably slidably trapped in a bearing recess. The cylindrical diameter of the rollers and their number is chosen so that the multiplicity of contacts reduces the surface unit loading to a value that guarantees hydrodynamic lubrication. Each roller extends radially outward into lubricant passage 63a and rollably engages the inner bearing surface of rocking sleeve 50.

Each roller has semi-spherical ends 74 and 76 engaging the end bearing surfaces 66 and 68 of each bearing recess to minimize any axial contact friction with cradle sleeve 53.

Each recess has a diameter slightly larger than the diameter of its roller to permit the roller to not only freely roll, but to create a hydrodynamic lubricating film between the roller and the cradle sleeve when the roller is rolling. When the rollers are initially rolled from a stopped position, each roller provides a linear contact between the roller and the rocking sleeve.

A hydrodynamic lubricating film of molten metal is formed between each roller and the inner cylindrical surface of the roller's recess, eliminating metal-to-metal contact between the cylindrical bearing surface of the roller and the cradle sleeve.

The cradle sleeve, each roller and the rocking sleeve are each formed of a harder metal than the trunnion to accommodate metal-to-metal contact between the roller and the rocking sleeve during start-up operation.

Figure 3:
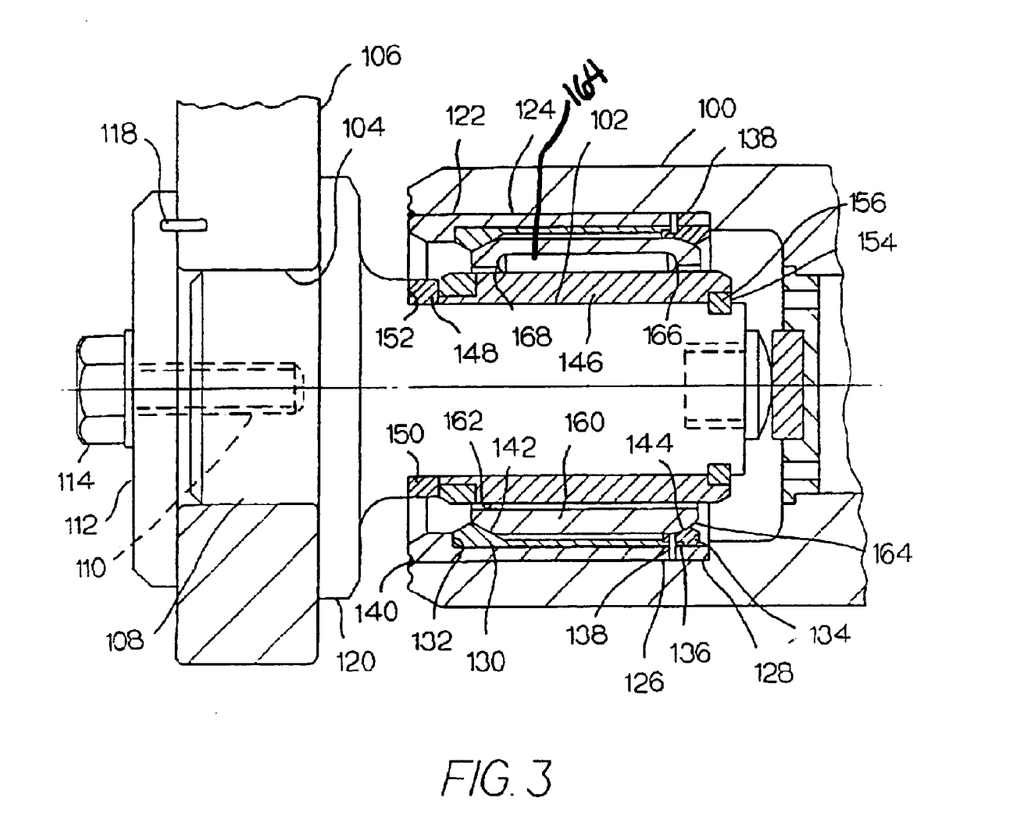
FIG. 3 is a view of another embodiment of the invention in which the trunnion is fastened to a holding arm.
Figure 4:
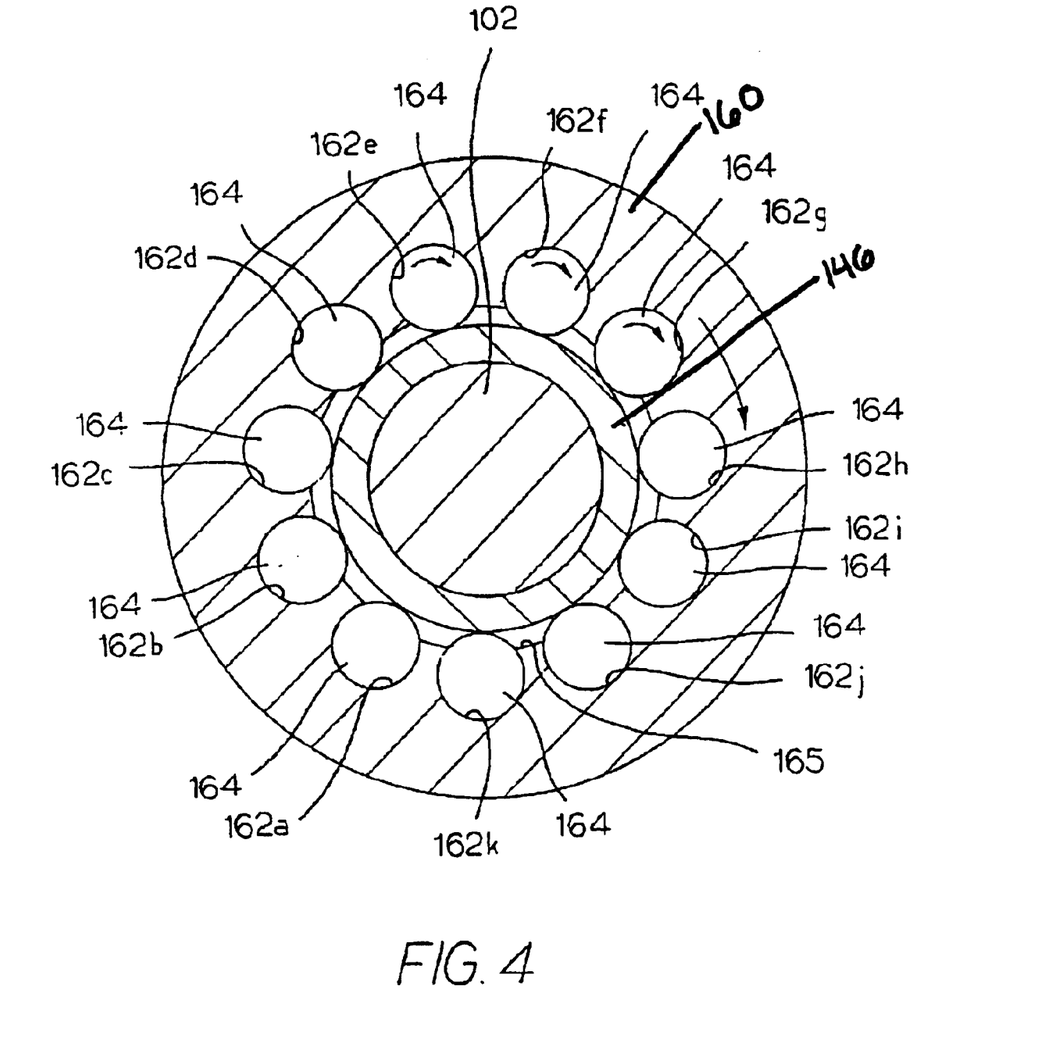
FIG. 4 is a sectional view as seen along lines 4—4 of FIG. 3.

FIGS. 3 and 4 illustrate another embodiment of the invention. A roll assembly 100 is supported by an arm/trunnion assembly, comprising a trunnion 102 mounted in an opening 104 of a holding arm 106. The trunnion is elongated and has an outer end 108 received in opening 104. The outer end of the trunnion has a threaded bore 110, which receives a tensor plate 112 having a diameter greater than the diameter of opening 104. A trunnion/holding bolt 114, mounted on the tensor plate threadably engages bore 110 of the trunnion. An arm pin 118 connects the tensor plate to the holding arm to prevent any rotation with respect to the holding arm.

The trunnion has an annular flange 120 with a diameter greater than the diameter of opening 104 to engage the inner surface of the holding arm. The trunnion is fixedly attached to the holding arm by tightening bolt 114.

Roll 100 has a bearing-receiving opening 122 for receiving a roller-bearing assembly generally indicated at 124. The roller-bearing assembly comprises a sleeve-like housing 126 having its outer end flush with the outer end of the roll and its inner end abutting shoulder 128 on the roll.

An outer race sleeve 130 has a cylindrical outer surface mounted in housing 126. One end of outer race sleeve 130 abuts an annular shoulder 132 in housing 126. The other end of the outer race sleeve is spaced from shoulder 128. An annular race end ring 134 is mounted in the bearing opening between the end of outer race sleeve 130 and shoulder 128. Ring 134 has an annular groove 136 receiving the inner end of the outer race sleeve. A pair of ring pins 138 attach race end ring 134, and outer race sleeve 130 to bearing housing 126 to lock the three components together as a unit after rocking sleeve 160 has been installed, to eliminate relative rotation.

The outer end of the bearing housing is welded at 140 to the roll, so bearing housing 126 rotates with roll 100.

Outer race sleeve 130 has a concave spherical annular sliding bearing surface 142. End ring 134 has a companion annular, concave, spherical bearing surface 144.

A trunnion wear sleeve 146 is mounted on trunnion 102 with an inner end engaging a pair of locking rings 148 and 150 which abut an annular flange 152 of the trunnion. When the trunnion sleeve is mounted on the trunnion, a pin 154 is received in a trunnion hole 156 to prevent any axial motion of trunnion sleeve 146 with respect to the trunnion.

A rocking cradle sleeve 160 is mounted around the trunnion sleeve. The rocking cradle sleeve has a pair of annular spherical convex bearing surfaces 162 and 164 slidably engaging the concave bearing surfaces 142 and 144 of the outer race sleeve 130 and end ring 134 to accommodate swiveling motion between the roll and the trunnion.

Referring to FIG. 4, the bore of the rocking sleeve has, for description purposes only, 11 cylindrical open roller-bearing recesses 162a–162k. A roller 164 is mounted in each of the bearing recesses to roll in the recess and into annular lubricant passage 165, in contact with the trunnion sleeve. Each roller has semi-spherical bearing ends to reduce axial friction, during operation. The roller ends touch the rocking sleeve bearing recesses' ends 166 and 168.

Figure 5:
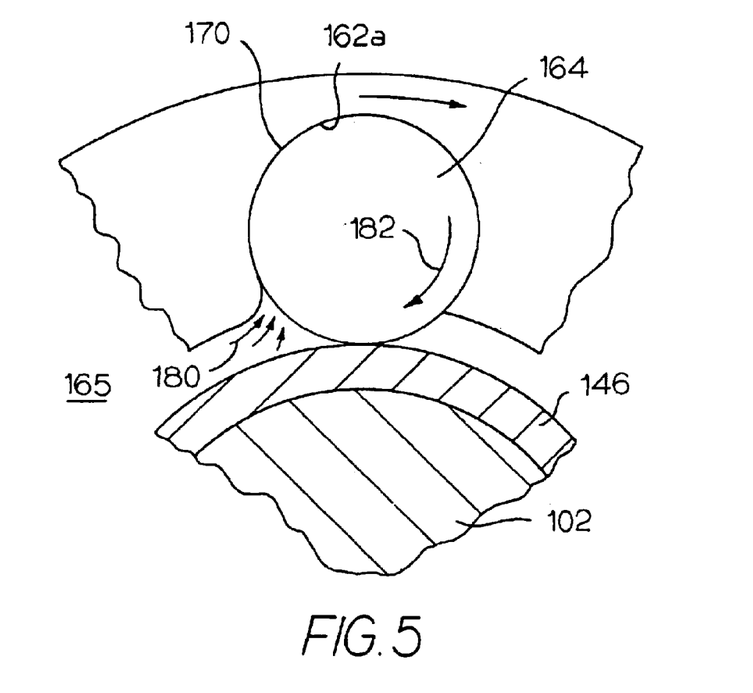
FIG. 5 is an enlarged view illustrating the hydrodynamic film lubrication created between the roller-bearing and the cradle.

FIG. 5 illustrates trunnion 102, and trunnion sleeve 146. A typical roller 164 is received in a typical recess 162a. The outer cylindrical diameter of the roller is slightly less than the cylindrical inner bearing surface of the recess to permit a hydrodynamic film 170 (thicker line) of the molten metal to pass from lubricant passage 165 between the roller and the recess in the direction of arrows 180 when the roller is rolling in the direction of arrow 182. Thus, a multiple line contact exists between the rollers and the trunnion sleeve when the roll-bearing assembly is rotating. The lubrication film eliminates sliding friction between the rollers and the rocking sleeve, minimizing wear and providing for a pressurized cushion of molten metal.

Figure 6:
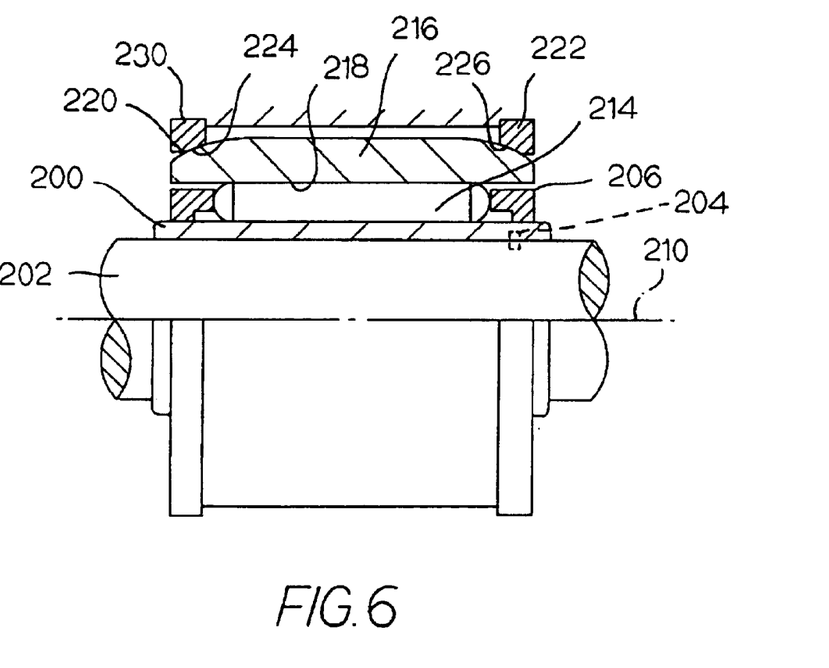
FIG. 6 is a sectional view of another embodiment of a roller-bearing intended for small load applications to be submerged in molten metal.
Figure 7:
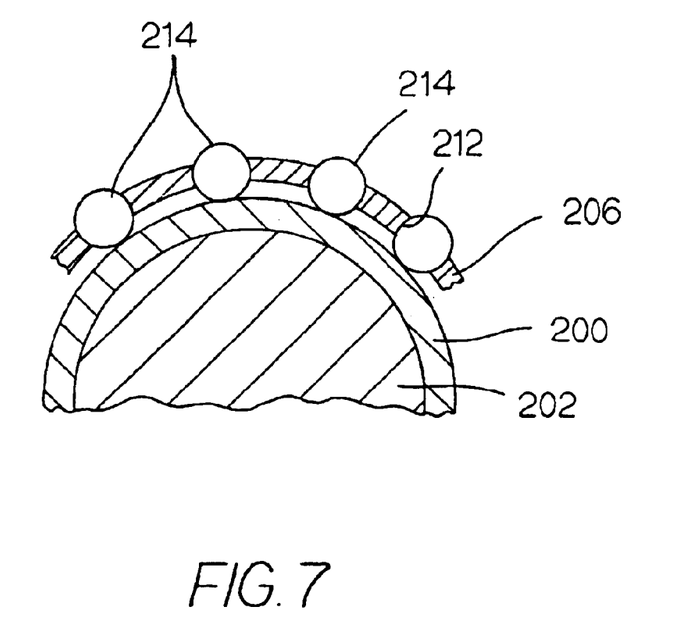
FIG. 7 is a partial sectional view of the embodiment of FIG. 6 with a roller removed.
Figure 8:
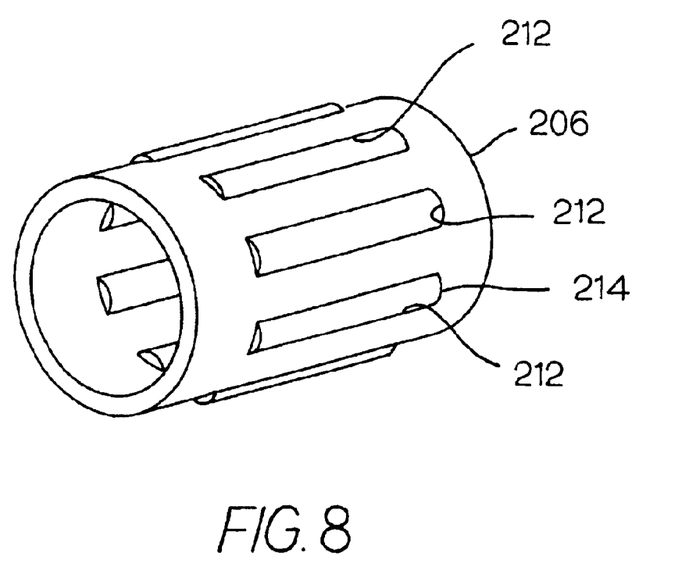
FIG. 8 is a perspective of the cage of the embodiment of FIG. 6 with two rollers removed and one installed.

FIGS. 6–8 illustrate still another embodiment of the invention for applications where small or light strip tension exists. A trunnion sleeve 200 is mounted on a trunnion 202. The trunnion sleeve has a cylindrical outer bearing surface and is fastened to the trunnion by pins 204 so that sleeve 200 rotates with the trunnion. A cylindrical guiding cage 206 is mounted around the trunnion sleeve for rotation about a trunnion axis 210. Guiding cage 206 has a plurality of elongated equally spaced roller recesses 212. A roller 214 is mounted in each of the recesses.

A rocking sleeve 216 is mounted on the rollers and has a cylindrical inner surface 218, which contacts the outer edge of the rollers along a linear contact engagement.

The rocking sleeve has annular convex spherical bearing surfaces 220 and 222 which engage concave bearing surfaces 224 and 226 of an outer race self-aligning ring 230. The recesses in the cage provide means for separating the rollers while permitting the trunnion to rotate with respect to the outer race, which in turn is attached to a holding arm (not shown).

All the components of the several bearing designs disclosed were made of materials with high hardness ($R_c$>45 at room temperature) that are resistant to solubility in the molten metal in which they are submerged. For example, if they are submerged in molten zinc or zinc/aluminum alloy, the preferred materials are:

| Percent | | |
|---|---|---|
| .30 | < Carbon < | 1.80 |
| 0.0 | < Chromium < | 12.0 |
| 3.0 | < Tungsten < | 14.0 |
| 3.0 | < Molybdenum < | 14.0 |
| 20.0 | < Iron < | 50.0 |
| 0.0 | ≦ Vanadium < | 4.0 |
| 0.0 | ≦ Niobium < | 4.0 |
| 4.0 | ≦ Cobalt < | 20.0 |
| 0.0 | ≦ Boron < | 1.0 |
| 0.0 | ≦ Manganese ≦ | 1.0 |
| 0.0 | < Silicon < | 3.0. |

Having described my invention, I claim:

1. A galvanizing roll assembly intended to be submerged in molten metal, comprising:
    an arm;
    a strip-engaging roll having a trunnion member, the trunnion member having a trunnion axis;
    a self-aligning bearing supporting the trunnion member on the arm for rotation about the trunnion axis, said self-aligning bearing including a roller-bearing,
    the trunnion member having an outer cylindrical bearing surface;
    the arm having a bearing housing member having an opening with an inner cylindrical bearing surface, for receiving the trunnion member in a generally coaxial position;
    a plurality of elongated rollers disposed between the trunnion member and the bearing housing member, the rollers each having a longitudinal axis supported parallel to the trunnion axis; and
    a roller carrier having an elongated recess for receiving each of the rollers for rotation within a respective recess, the roller carrier being connected to one of said members such that the rollers roll with the other of said members.

2. A galvanizing roll assembly as defined in claim 1, in which each of the recesses has an open, partially cylindrical recess wall, each of the rollers having a cylindrical wall, mounted in its respective recess to define annular clearance for passing a hydrodynamic lubricating molten metal film between the roller and the recess wall as the roller is being rotated in a bath of a molten metal.

3. A galvanizing roll assembly as defined in claim 1, in which the trunnion member is attached to the roll to rotate therewith.

4. A galvanizing roll assembly as defined in claim 1, in which the arm assembly has self-aligning capability.

5. A galvanizing roll assembly as defined in claim 1, in which the self-aligning bearing, including the trunnion member, the bearing housing member, and the plurality of elongated rollers are each formed of an alloy material that is relatively insoluble in molten zinc, molten aluminum, or mixtures thereof, and contain an alloy material with a hardness $R_c$>25 at the molten metal operating temperature.

6. A galvanizing roll assembly as defined in claim 1, in which the alloy material includes an alloy material comprising by weight:

| Percent | | |
|---|---|---|
| .30 | < Carbon < | 1.80 |
| 0.0 | < Chromium < | 12.0 |
| 3.0 | < Tungsten < | 14.0 |
| 3.0 | < Molybdenum < | 14.0 |
| 20.0 | < Iron < | 50.0 |
| 0.0 | ≦ Vanadium < | 4.0 |
| 0.0 | ≦ Niobium < | 4.0 |
| 4.0 | ≦ Cobalt < | 20.0 |
| 0.0 | ≦ Boron < | 1.0 |
| 0.0 | ≦ Manganese ≦ | 1.0 |
| 0.0 | < Silicon < | 3.0. |

7. In a galvanizing roll assembly a bearing apparatus useful for supporting a roll for transferring a heated steel strip in a bath of molten zinc, molten aluminum or mixtures thereof, said bearing assembly comprising:
    a roll (100) rotatable about a roll axis;
    a supporting arm;
    a trunnion member (102), carried on the supporting arm, the trunnion member having a longitudinal trunnion axis fixed with respect to the arm;
    a self-aligning bearing means carried by the roll and supported by the trunnion member such that the roll rotates with respect to the trunnion member; including:
        a housing (126) fixedly mounted in the roll;
        first annular bearing structure (146) rotatably mounted in the housing and having a cylindrical inner surface fixedly mounted on the trunnion member, and an outer surface having an annular partially spherical bearing surface disposed around the trunnion member;
        second annular bearing structure fixedly mounted in the housing, the second annular bearing structure slidably engaging the partially spherical surface of the first annular bearing structure to permit the roll axis to swing within an acute angle with respect to the fixed axis of the trunnion member as the roll is rotating;
        a plurality of elongated rollers (164) disposed between said first and second bearing structures, the rollers each having a longitudinal axis supported parallel to the trunnion axis; and a roller rocking cradle (160) having an elongated recess for receiving each of the rollers for rotation within a respective recess, the roller cradle being connected to one of said bearing structures such that the other rollers roll with the said one of said bearing structures.

8. In a galvanizing roll assembly, including:

an arm;

a rotatable rotating roll;

a trunnion shaft having an axis and carried on the roll, so as to be rotatable therewith;

a self-aligning bearing means mounted on the arm for supporting the roll for rotation comprising:

a housing fixedly mounted on the roll;

first annular bearing structure movably mounted in the housing and having a cylindrical inner surface of a rotatably mounted on the trunnion shaft, and an outer surface having an annular partially spherical bearing surface disposed around the trunnion shaft;

second annular bearing structure fixedly mounted in the housing and having a fixed bearing axis, the second annular bearing structure slidably engaging the partially spherical surface of the first bearing structure to permit the roll axis to swing with respect to the fixed bearing axis;

a plurality of elongated rollers disposed between said bearing structures, the rollers each having a longitudinal axis supported parallel to the trunnion axis; and a roller cradle having an elongated recess for receiving each of the rollers for rotation within a respective recess, the roller cradle being connected to one of said bearing structures such that the rollers roll with the other of said bearing structures.

9. In a galvanizing roll assembly as defined in claim 7, in which the bearing means is carried within the roll.

10. In a galvanizing roll assembly as defined in claim 7, in which the rollers form a multiple line bearing contact between said bearing structures.

11. A galvanizing roll assembly intended to be submerged in molten metal, comprising:

an arm;

a strip-engaging roll having a trunnion;

a self-aligning bearing supporting the trunnion on the arm, said self-aligning bearing including a roller-bearing, said arm, said roll and said self-aligning bearing each comprising alloy materials that present low solubility with a particular molten metal in which they are to be submerged and having a high hardness, $R_c > 25$, at the molten metal operating temperature;

the trunnion member having an outer cylindrical bearing surface;

the arm assembly having a bearing housing member having an opening with an inner cylindrical bearing surface, for receiving the trunnion member in a generally coaxial position;

the trunnion member having a trunnion axis;

a plurality of elongated rollers disposed between the trunnion member and the bearing housing member, the rollers each having a longitudinal axis supported parallel to the trunnion axis;

a roller carrier having an elongated recess for receiving each of the rollers for rotation within a respective recess, the roller carrier being connected to one of said members such that the rollers roll with the other of said members; and each of the recesses having an open, partially cylindrical recess wall, each of the rollers having a cylindrical wall, and including an annular clearance between each of the rollers and its respective recess wall for passing a hydrodynamic lubricating molten metal film between the roller and the recess wall as the roller is being rotated in a bath of a molten metal.

12. A galvanizing roll assembly as defined in claim 8, in which the alloy materials comprise by weight:

| | Percent | |
|---|---|---|
| .30 | < Carbon < | 1.80 |
| 0.0 | < Chromium < | 12.0 |
| 3.0 | < Tungsten < | 14.0 |
| 3.0 | < Molybdenum < | 14.0 |
| 20.0 | < Iron < | 50.0 |
| 0.0 | ≦ Vanadium < | 4.0 |
| 0.0 | ≦ Niobium < | 4.0 |
| 4.0 | ≦ Cobalt < | 20.0 |
| 0.0 | ≦ Boron < | 1.0 |
| 0.0 | ≦ Manganese ≦ | 1.0 |
| 0.0 | < Silicon < | 3.0. |

13. In a galvanizing roll assembly including a supporting arm, a roll rotatable about a roll axis, a bearing apparatus useful for supporting the roll on the supporting arm for transferring a heated steel strip in a bath of molten zinc, molten aluminum or mixtures thereof, said bearing apparatus comprising:

structure on the roll having a bearing opening;

a trunnion;

an arm supporting the trunnion in a fixed position with respect to the arm, the trunnion being rotatably receivable in the bearing opening to support the roll for rotation with respect to the arm, and the trunnion and the bearing opening defining a clearance therebetween for passing a hydrodynamic film of molten zinc, molten aluminum or a mixture thereof therethrough.

14. In a galvanizing roll assembly as defined in claim 13, in which the roll has an end opening, and the bearing apparatus is supported in said end opening.

15. A galvanizing roll assembly as defined in claim 2, in which the molten metal hydrodynamic film forms a cushion between the roller and the recess wall.

16. In a galvanizing roll assembly as defined in claim 13, including a wear sleeve mounted on the trunnion in the bearing opening.

* * * * *